(12) United States Patent
Fama et al.

(10) Patent No.: US 8,705,723 B2
(45) Date of Patent: *Apr. 22, 2014

(54) SYSTEMS AND METHODS FOR SCHEDULING CONTACT CENTER AGENTS

(75) Inventors: Jason Fama, Foster City, CA (US); Uri Peleg, Santa Clara, CA (US); Simon Shvarts, Cupertino, CA (US); Mike Bourke, San Francisco, CA (US); James Gordon Nies, Carmel, IN (US); Vinod Prabhu, Fremont, CA (US)

(73) Assignee: Witness Systems Inc., Roswell, GA (US)

( * ) Notice: Subject to any disclaimer, the term of this patent is extended or adjusted under 35 U.S.C. 154(b) by 1110 days.

This patent is subject to a terminal disclaimer.

(21) Appl. No.: 12/684,027

(22) Filed: Jan. 7, 2010

(65) Prior Publication Data

US 2010/0114644 A1 May 6, 2010

Related U.S. Application Data

(63) Continuation of application No. 11/768,349, filed on Jun. 26, 2007, now Pat. No. 7,660,407, which is a continuation of application No. 11/540,451, filed on Sep. 29, 2006, now abandoned.

(60) Provisional application No. 60/816,785, filed on Jun. 27, 2006, provisional application No. 60/817,680, filed on Jun. 30, 2006.

(51) Int. Cl.
*H04M 3/00* (2006.01)

(52) U.S. Cl.
USPC .................................. 379/265.05; 379/265.01

(58) Field of Classification Search
USPC ........ 379/265.01–265.14, 266.01–266.1, 309
See application file for complete search history.

(56) References Cited

U.S. PATENT DOCUMENTS

| 5,111,391 | A | | 5/1992 | Fields et al. | |
| 5,164,983 | A | * | 11/1992 | Brown et al. | 379/265.03 |
| 5,903,641 | A | * | 5/1999 | Tonisson | 379/265.12 |
| 6,115,693 | A | | 9/2000 | McDonough et al. | |
| 6,925,165 | B2 | * | 8/2005 | Cohen et al. | 379/265.01 |
| 2004/0062380 | A1 | * | 4/2004 | Delaney | 379/265.02 |

FOREIGN PATENT DOCUMENTS

WO 2006058004 A1 6/2006

* cited by examiner

*Primary Examiner* — William Deane, Jr.
(74) *Attorney, Agent, or Firm* — Andrus Intellectual Property Law, LLP

(57) ABSTRACT

Systems and methods for scheduling workforces are provided. In this regard, a representative method includes: generating a forecast requirement related to a volume of work to be handled by a first workforce and a second workforce, wherein the second workforce is remote from the first workforce; generating work schedules for personnel of the second workforce based on the forecast requirement and skills of the personnel of the second workforce; receiving information corresponding to the work schedules and the skills of the personnel of the second workforce that share work with the first workforce, wherein the work schedules comprise activities; correlating the skills contained in the information with skills that are to be used for scheduling personnel of the first workforce; correlating the activities contained in the information with activities that are to be used for scheduling the personnel of the first workforce; and generating work schedules for the personnel of the first workforce based, at least in part, on a correlation between the skills of the personnel of the second workforce and the first workforce and a correlation between the activities of the personnel of the second workforce and the first workforce.

15 Claims, 7 Drawing Sheets

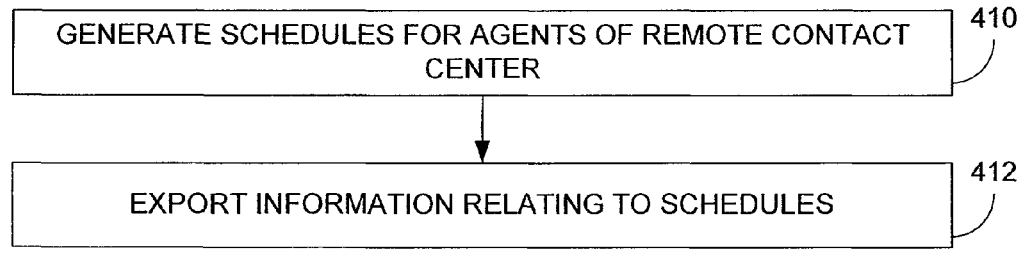

FIG. 4

```
<EmployeeList>
    <OrganizationName>PSI-03</OrganizationName>
    <Employee>
        <FirstName>Dong</FirstName>
        <LastName>Ngo</LastName>
        <MiddleInitial></MiddleInitial>
        <AdditionalInfo>
            <EmployeeSchedule>
                <ShiftAssignment>
                    <Event/>
                    <ShiftActivity>
                        <Event>
                            <Activity>Meeting</Activity>
                            <Start>2005-10-03 10:00:00</Start>
                            <End>2005-10-03 10:15:00</End>
                        <Event>
                    </ShiftActivity>
                </ShiftAssignment>
            </EmployeeScedule>

<SkillAssignment>
                <Skill>Phone</Skill>
                <Reserve>false</Reserve>
            </SkillAssignment>

<SkillAssignment>
                <Skill>Email</Skill>
                <Reserve>true</Reserve>
            </SkillAssignment>

</AdditionalInfo>
    </Employee>
</EmployeeList>
```

FIG. 5

SYSTEMS AND METHODS FOR SCHEDULING CONTACT CENTER AGENTS

CROSS REFERENCE TO RELATED APPLICATIONS

This application is a continuation application that claims the benefit of and priority to U.S. Utility application Ser. No. 11/768,349, filed on Jun. 26, 2007 now U.S. Pat. No. 7,660,407, which itself is a continuation of and claims priority to U.S. Utility application Ser. No. 11/540,451, which was filed Sep. 29, 2006 now abandoned, and U.S. Provisional Applications having Ser. Nos. 60/816,785 and 60/817,680, which were filed on Jun. 27, 2006 and Jun. 30, 2006, respectively, each of the aforementioned applications being incorporated by reference herein.

TECHNICAL FIELD

The present invention is generally related to scheduling of contact center resources.

DESCRIPTION OF THE RELATED ART

Resource allocation and planning, including the generation of schedules for employees, is a complex problem for enterprises. Telephone call center resource allocation and scheduling is an example of a problem with a large number of variables. Variables include contact volume at a particular time of day, available staff, skills of various staff members, call type (e.g., new order call and customer service call), and number of call queues, where a call queue may be assigned a particular call type. A basic goal of call center scheduling is to minimize the cost of agents available to answer calls while maximizing service.

Traditionally, call center scheduling is performed by forecasting incoming contact volumes and estimating average talk times for each time period based on past history and other measures. These values are then correlated to produce a schedule. However, due to the number of variables that may affect the suitability of a schedule, many schedules need to be evaluated.

Recently, call centers have evolved into "contact centers" in which the agent's contact with the customer can be through many contact media. For example, a multi-contact center may handle telephone, email, web callback, web chat, fax, and voice over internet protocol. Therefore, in addition to variation in the types of calls (e.g., service call, order call), modern contact centers have the complication of variation in contact media. The variation in contact media adds complexity to the agent scheduling process. Additional complexity results when multiple geographically distributed contact center sites are involved.

SUMMARY

Systems and methods for scheduling workforces are provided. In this regard, a representative method includes: generating a forecast requirement related to a volume of work to be handled by a first workforce and a second workforce, wherein the second workforce is remote from the first workforce; generating work schedules for personnel of the second workforce based on the forecast requirement and skills of the personnel of the second workforce; receiving information corresponding to the work schedules and the skills of the personnel of the second workforce that share work with the first workforce, wherein the work schedules comprise activities; correlating the skills contained in the information with skills that are to be used for scheduling personnel of the first workforce; correlating the activities contained in the information with activities that are to be used for scheduling the personnel of the first workforce; and generating work schedules for the personnel of the first workforce based, at least in part, on a correlation between the skills of the personnel of the second workforce and the first workforce and a correlation between the activities of the personnel of the second workforce and the first workforce.

Other systems, methods, features and/or advantages of the present invention will be or become apparent to one with skill in the art upon examination of the following drawings and detailed description. It is intended that all such additional systems, methods, features and/or advantages be included within this description and protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4 is a flowchart illustrating functionality (or method steps) that can be performed by an embodiment of a remote contact center.

FIG. 5 is a diagram illustrating an embodiment of a file that can be exported by a remote contact center.

DETAILED DESCRIPTION

Systems and methods for scheduling contact center agents are provided. In this regard, current workforce optimization (WFO) solutions can potentially provide planning, forecasting, scheduling, and tracking and performance analysis services for customers who have full control over contact center work load as well as resources (e.g., agents) available to handle this work load. The typical implementation of such a solution is a centralized system with a single database deployed on premises. However, this approach is changing due to outsourcing.

For contact centers that share contacts across their own sites and outsourced sites through percent allocation or virtual routing, outsourcing of contact center activities (e.g., scheduling of agents and agent handling of contacts) tends to distribute control from a single ("local") contact center to multiple other ("remote") contact centers. As control over these activities is divested from the local contact center, the ability of the local contact center to plan efficient agent staffing and scheduling can be degraded.

Currently, in order to compensate for lack of information and control involving work resources available at remote contact centers, a customer may attempt to model the resources available at the remote sites within the customer's system. However, such a customer typically does not have full information about the resources available (e g , skills of the agents at the remote sites) or schedules, thereby reducing the accuracy of planning.

In order to alleviate these difficulties, at least some embodiments of the systems for scheduling contact center agents among geographically distributed sites involve the use of a distributed set of servers. That is, instead of operating only a centralized database and application server at the local site, in some embodiments, at least one server is deployed at each of the remote ("outsourcer") sites, in addition to a server being deployed at the local site. The servers are used to implement workforce manager applications that are used to generate agent schedules for staffing the respective contact centers. Additionally, the servers located at the remote sites are used to export information relating to their scheduled agents, with the information being imported to the server of the local site. The local server then uses the information for facilitating efficient planning for use of the local contact center resources.

Figure 1:
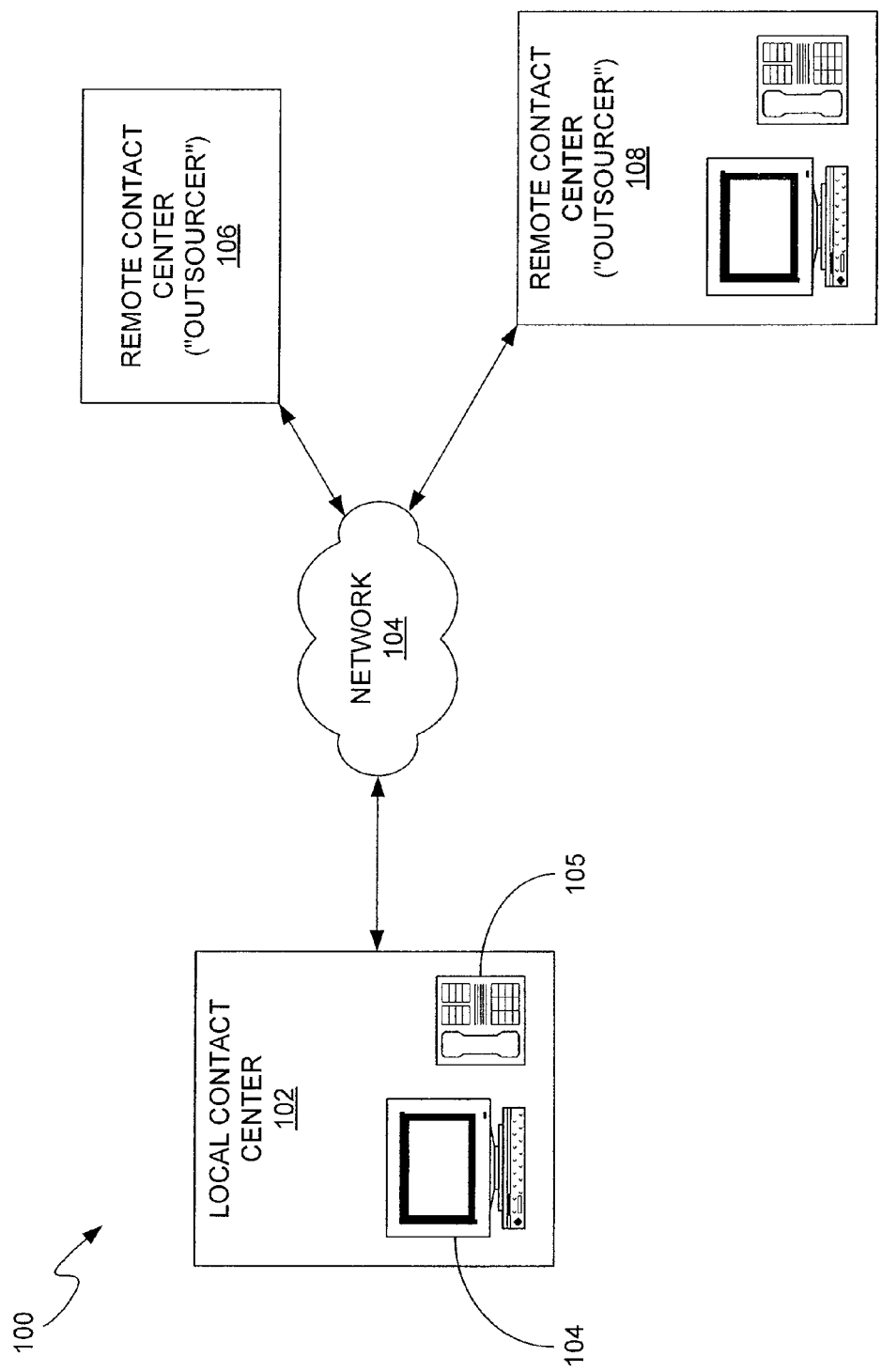
FIG. 1 is a schematic diagram illustrating an exemplary embodiment of a system for scheduling contact center agents.

Referring to the drawings, FIG. 1 is a schematic diagram illustrating an exemplary embodiment of a system for scheduling contact center agents. In this regard, system 100 incorporates a local contact center 102. The local contact center has access to various resources including a staff of agents that is used to interact with customers who communicate with the local contact center. It should be noted that interactions between an agent and a customer can be facilitated through the use of various media. By way of example, interactions can take place via telephone (such as via telephone 104), voice over Internet Protocol (VoIP), email (such as via workstation 105) and chat, for example, with such communication taking place via network 104.

System 100 also includes remote contact centers 106 and 108, each of which is geographically distributed with respect to local contact center 102. Each of these contact centers is able to communicate information to the local contact center and/or receive information from the local contact center via the network. In particular, communication of information between the remote contact centers and the local contact center can enable the local contact center to effectively utilize its staff of agents as will be described in detail below. It should be noted that although two remote contact centers are depicted in FIG. 1, various other numbers of such contact centers can be provided in other embodiments.

Figure 2:
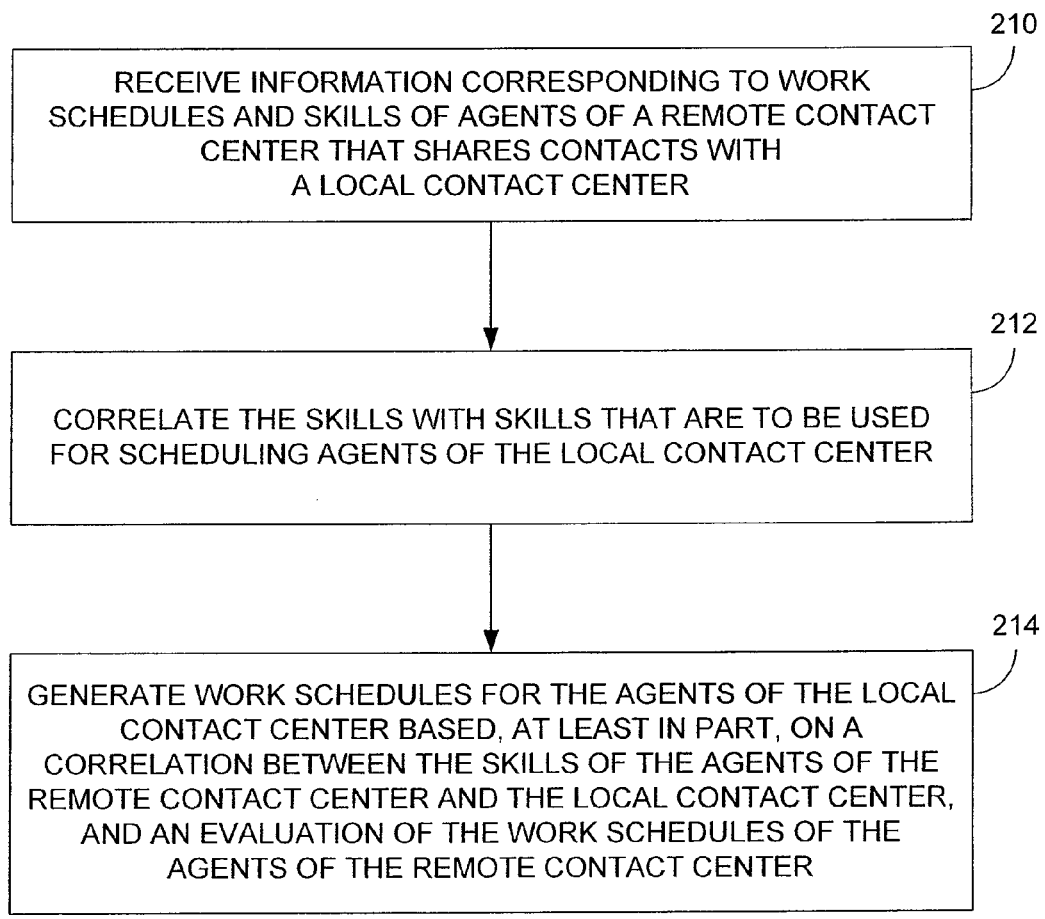
FIG. 2 is a flowchart illustrating functionality (or method steps) that can be performed by an embodiment of a system for scheduling contact center agents.

FIG. 2 is a flowchart illustrating functionality (or method steps) that can be performed by an embodiment of a system for scheduling contact center agents, such as the embodiment depicted in FIG. 1. In this regard, the functionality may be construed as beginning at block 210, in which information is received. Specifically, the information corresponds to work schedules and skills of agents of a remote contact center that shares contacts with a local contact center. In this regard, "contacts" denote the communications involved in facilitating interactions between agents and customers. Notably, information corresponding to various skills of the contact center agents, such as information corresponding to skills possessed, skill priority and skill proficiency, can be provided.

In block 212, the skills communicated by the information are correlated with skills that are to be used for scheduling agents of the local contact center. In some embodiments, such as when the scheduling system used to provide the skills information is compatible (e.g., identical) with the scheduling system being used by the local contact center, the correlation of information can be performed automatically. In other embodiments, such correlation may be performed manually or in a semi-automated manner, as will be described in greater detail later.

In block, 214, work schedules for the agents of the local contact center are generated. Specifically, the work schedules are based, at least in part, on a correlation between the skills of the agents of the remote contact center and the local contact center, and an evaluation of the work schedules of the agents of the remote contact center.

Figure 3:
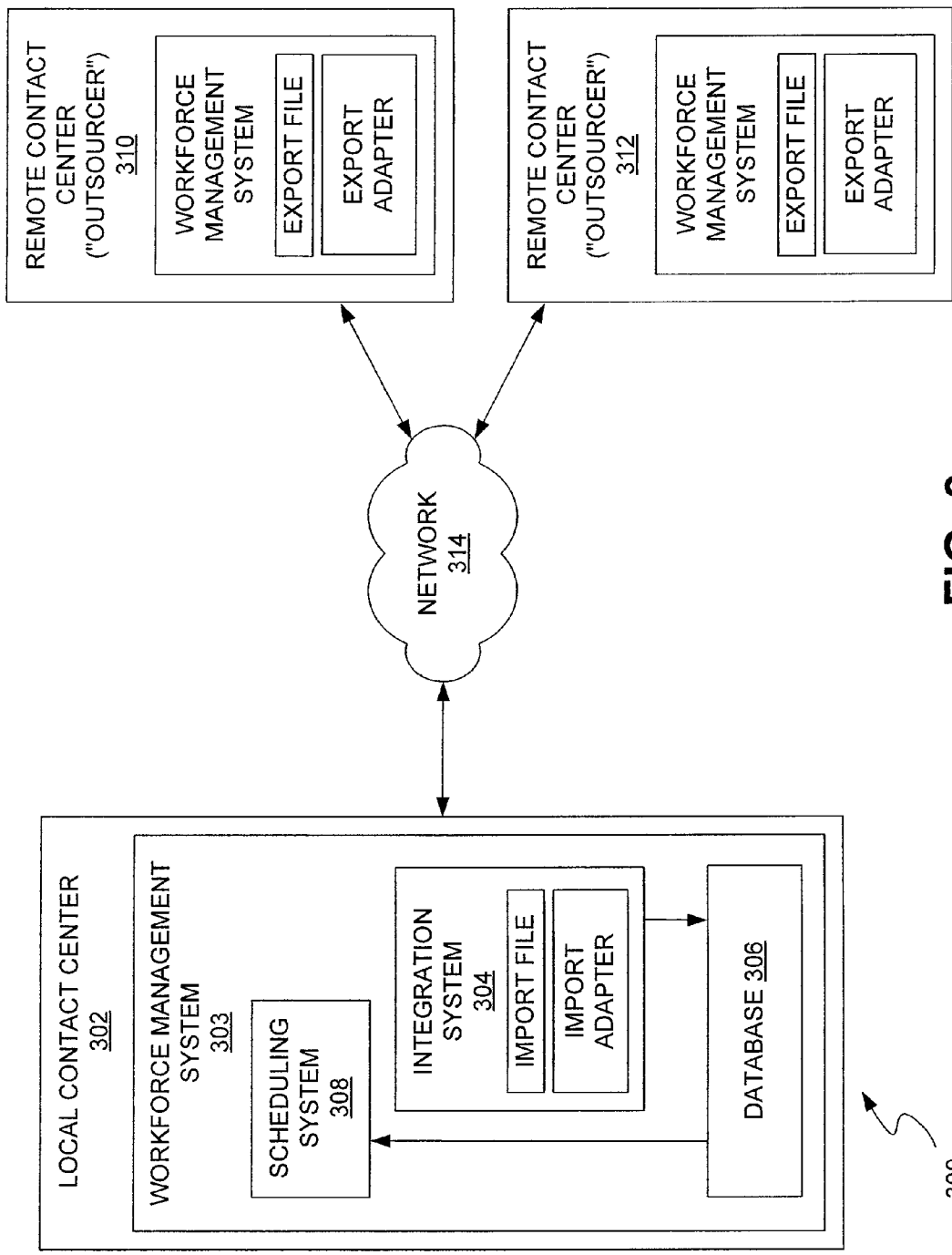
FIG. 3 is a schematic diagram illustrating another exemplary embodiment of a system for scheduling contact center agents.

FIG. 3 is a schematic diagram illustrating another exemplary embodiment of a system for scheduling contact center agents. In particular, system 300 incorporates a local contact center 302. The local contact center has access to various resources including a staff of agents that is used to interact with customers who communicate with the local contact center. Local contact center 302 includes a workforce management system 303 that includes an integration system 304, a database 306 and a scheduling system 308. Notably, the workforce management system can be implemented by one or more applications running on one or more servers, for example.

System 300 also includes remote contact centers 310 and 312, each of which typically is geographically distributed with respect to local contact center 302. Each of the remote contact centers is able to communicate information to the local contact center and/or receive information from the local contact center via network 314. Notably, each of the remote contact centers has access to various resources including a staff of agents that is used to interact with customers. In some embodiments, contacts are distributed among the local and remote contact centers via percent allocation or virtual routing, for example.

Notably, each of the remote contact centers and the local contact center typically is responsible for staffing and scheduling of its respective staff of agents. In this regard, each of the remote contact centers typically schedules its staff based on general contact-handling requirements that are communicated to the remote contact center through an outsourcing agreement with the local contact center in the form of forecasted requirements. In contrast, the local contact center uses more specific information obtained from the remote contact centers in order to facilitate staffing and scheduling of its agents as will be described in greater detail below.

In operation, workforce management system 303 is able to communicate forecasted requirements, such as agent requirements, workload to be handled and specific schedules to be staffed, to one or more of the remote contact centers. It should be noted that, in some embodiments, the remote contact centers need not be provided with forecasted requirements. Regardless, the remote contact centers generate work schedules for their agents, such as by using other potentially disparate workforce management systems (e.g., remote contact center 310 uses workforce management system 316). Once generated, information related to the generated schedules is communicated to the local contact center via the network, such as by each of the remote contact centers exporting a file containing the information. By way of example, in the embodiment of FIG. 3, remote contact center 310 communicates export file 320 to the integration system 304 of local contact center 302.

In this regard, FIG. 4 is a flowchart illustrating functionality (or method steps) that can be performed by an embodiment of a remote contact center. As shown in FIG. 4, the functionality may be construed as beginning at block 410, in which schedules for agents of the remote contact center are generated. In block 412, information related to the schedules is exported.

In some embodiments, a schedule export adapter of a workforce management system of the remote contact center is used to prepare and export information related to the schedules. In particular, the information can include one or more of the following: a list of agents, skills of the agents, and generated work schedules for the agents. The information then can be communicated, such as in a selected file format, to the local contact center via the network.

In some embodiments, a schedule export adapter includes the following configuration items: location of export file (e.g., an edit box can specify the location of the export file); an agent filter (e.g., a drop down menu item that contains a list) used to determine which agent schedules are to be exported; and a timer setting (e.g., a box used to specify how often a file should be exported (for example, every 30 minutes).

Once configured, the schedule export adapter can place a file containing the agents, skills and schedules in the specified location. Notably, the schedules contain the activities that each agent is scheduled to perform.

It should be noted that various file types and arrangements of data can be used to provide the information to the local contact center. In this regard, FIG. 5 is a diagram illustrating an embodiment of a file, in this case an XML file, that can be exported by a workforce management system of a remote contact center and which includes such information.

As shown in FIG. 5, the file includes an employee list (<EmployeeList>) that is delineated by organization (<OrganizationName>). Within each organization is a list of agents. Included with each agent (<Employee>) is information corresponding to the agent's name (<FirstName>, <LastName>, and <MiddleInitial>), as well as additional information. This additional information (<AdditionalInfo>) includes a work schedule (<EmployeeSchedule>) and skills of the agent (<SkillAssignment>).

An integration system of the local contact center includes an schedule import adapter that is used to extract information from the files exported from the remote contact centers. An embodiment of such an adapter can include: the location of the import file (e.g., an edit box to specify the location of a file that was exported); activity and skill maps; and the name of the organization in which schedules associated with the export file should be placed on the local system.

Additionally, skip mappings are provided for the same reason.

Figure 6:
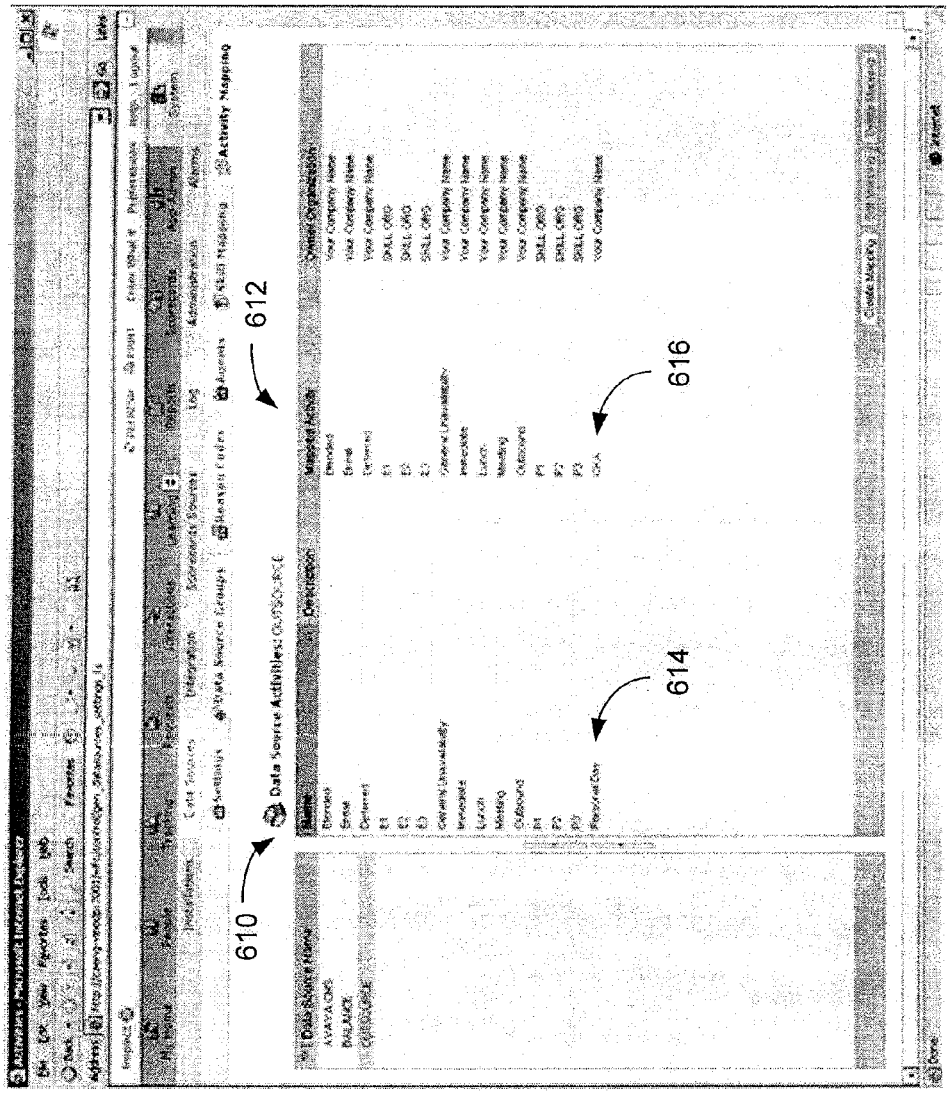
FIG. 6 is a diagram illustrating a representative screen that can be used to perform activity mapping.

In this regard, FIG. 6 is a diagram illustrating a representative screen that can be used to perform activity mapping. Specifically, such a screen can be used to specify the name of an activity on the workforce management system of the local contact center that corresponds to an activity listed in the exported file. This may be necessary as the remote contact center may use different names for their activities than those used by the local contact center. By way of example, screen 600 incorporates a Name field 610 that lists names of activities from the exported file. A Mapped Activity field 612 is used to designate correspondence between activities from the exported file and activity names used by the local contact center. By way of example, field 610 includes an activity 614 entitled "Personal Day" that is mapped to a corresponding mapped activity 616 entitled "CKA." Thus, each instance of a Personal Day activity discovered in the exported file will be recognized as a CKA activity by the local contact center for scheduling purposes.

In order to use the file exported by a remote contact center, some embodiments incorporate the use of a dialog box associated with the workforce management system. In this regard, FIG. 7 is a diagram illustrating a representative dialog box 700 that can be used in importing of such information.

Figure 7:
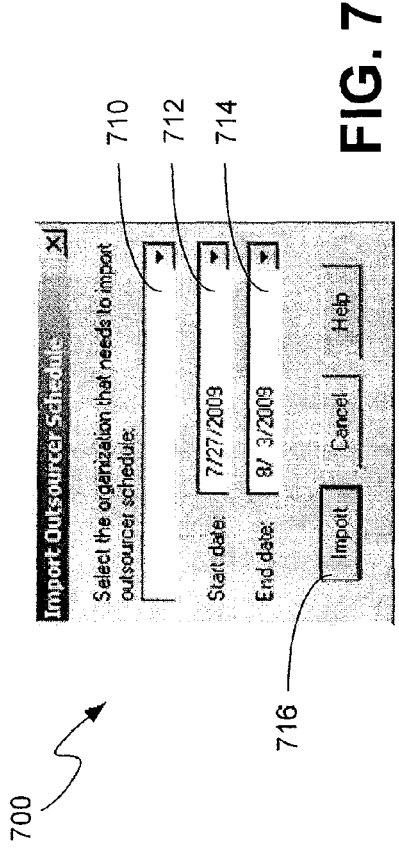
FIG. 7 is a diagram illustrating a representative dialog box that can be used in importing of outsourcer schedules.

As shown in FIG. 7, a user designates an organization from which information is to be imported. This is accomplished by entering an organization name in field 710. A date range also is entered in the fields 712 and 714, with the range designating a scheduling period of interest.

Figure 8:
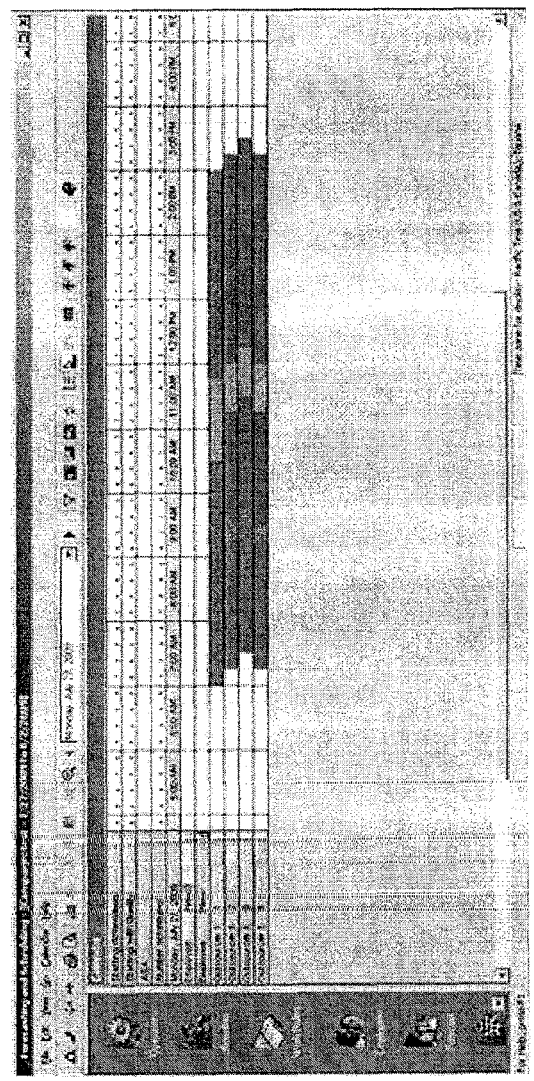
FIG. 8 is a diagram illustrating a representative screen associated with a staffing profile.

Responsive to actuating the import actuator 716, the schedule import adapter parses the imported file and creates staffing profiles. These staffing profiles include agent skills and schedules. FIG. 8 is a diagram illustrating a representative screen 800 associated with a staffing profile. As shown in FIG. 8, schedules of four agents of a remote contact center (Outsourcers 1-4) are shown.

Since each of the agents of the remote contact center has an established schedule and corresponding skills, scheduling of agents of the local contact center can be generated using this knowledge. That is, the staffing profiles are considered as counting towards service levels when scheduling or simulating by the local contact center. Thus, more effective scheduling of the local contact center agents can be accomplished.

It should be noted that, in this embodiment, the schedules for the agents of the remote contact centers are locked. That is, regardless of the schedules determined for the agents of the local contact center, the schedules of the agents of the remote contact center are not altered. However, in some embodiments, the schedules of the agents of the remote contact centers can be unlocked, thus allowing scheduling determinations from the local contact center to influence the schedules of the remote contact center agents.

More information on various aspects of multi-site contact centers can be found, for example, in U.S. patent application Ser. No. 11/385,499, filed on Mar. 21, 2006, which is incorporated herein by reference.

Figure 9:
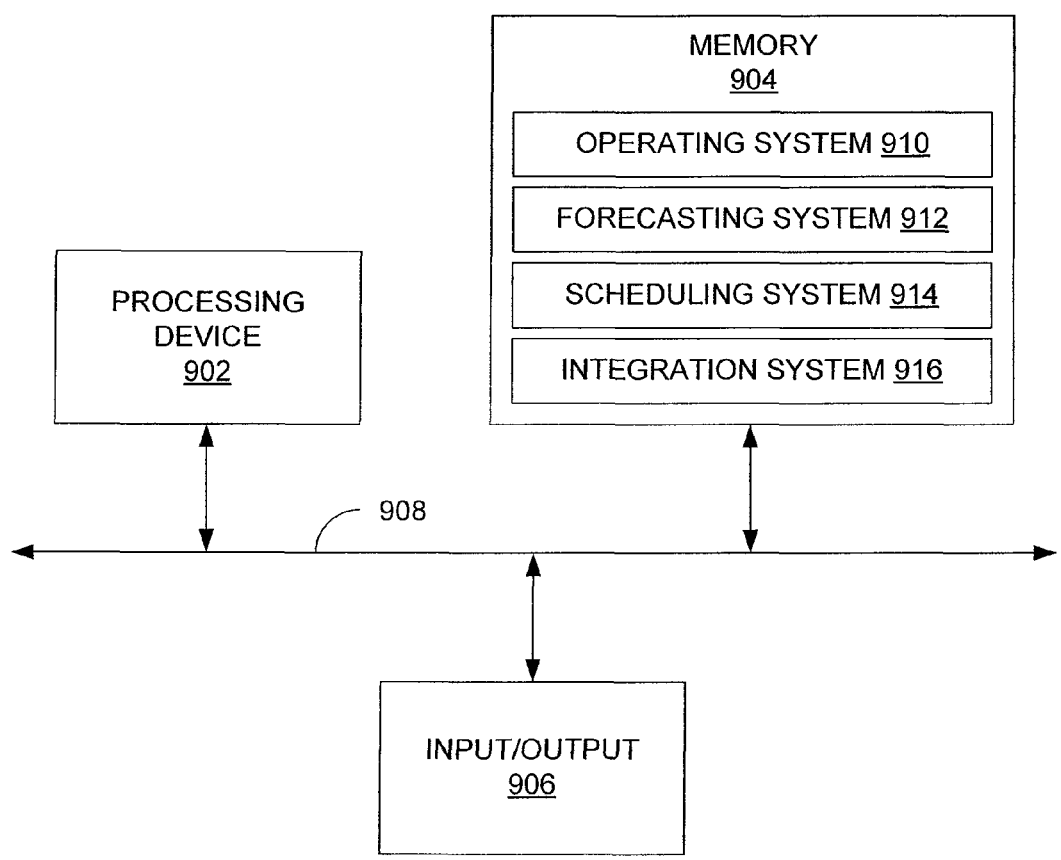
FIG. 9 is a schematic diagram of a computer that can be used to implement an embodiment of a system for scheduling contact center agents.

FIG. 9 is a schematic diagram of a computer 900 that can be used to implement an embodiment of a system for scheduling contact center agents. It should be noted that the computer 900 could be located in a local contact center or at a location connected to the local contact center via a communication network. Generally, the computer includes a processing device 902, memory 904, and input/output device 906 that intercommunicate via local interface 908. The local interface can include, for example, but is not limited to one or more buses or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processing device can be a hardware device for executing software, particularly software stored in memory. The processing device can be a custom made or commercially available processor, a central processing unit (CPU) or an auxiliary processor among several processors, a semiconductor-based microprocessor (in the form of a microchip or chip set), a macroprocessor, or generally any device for executing software instructions.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory (as well as various other components) can have a distributed architecture, where various components are situated remote from one another, but can be accessed by the processing device. Additionally, the memory can include an operating system 910, as well as instructions associated with various subsystems, such as a forecasting system 912, which can be used to provide forecasted requirements, a scheduling system 914, which can be used to generate agent schedules, and an integration system 916, which can be used to receive information regarding agents of a remote contact center.

It should be noted that a system component embodied as software may also be construed as a source program, executable program (object code), script, or any other entity comprising a set of instructions to be performed. When constructed as a source program, the program is translated via a compiler, assembler, interpreter, or the like, which may or may not be included within the memory, so as to operate properly in connection with the operating system.

When the computer is in operation, the processing device is configured to execute software stored within the memory, to communicate data to and from the memory, and to generally control operations of the system pursuant to the software. Software in memory, in whole or in part, is read by the processing device, perhaps buffered, and then executed.

It should be noted that the flowcharts included herein show the architecture, functionality and/or operation of implementations that may be configured using software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

It should be noted that any of the executable instructions, such as those depicted functionally in the accompanying flowcharts, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured media.

It should be emphasized that the above-described embodiments are merely possible examples of implementations. Many variations and modifications may be made to the above-described embodiments. All such modifications and variations are intended to be included herein within the scope of this disclosure.

Therefore, having thus described the invention, at least the following is claimed:

1. A computerized method for scheduling a workforce, the method comprising:
   generating with a first processor a forecast requirement related to a volume of work to be handled by a first workforce and a second workforce, wherein the second workforce is remote from the first workforce;
   generating with a second processor work schedules for personnel of the second workforce based on the forecast requirement and skills of the personnel of the second workforce;
   receiving with the first processor information corresponding to the work schedules and the skills of the personnel of the second workforce that share work with the first workforce, wherein the work schedules comprise activities;
   correlating with the first processor the skills contained in the information with skills that are to be used for scheduling personnel of the first workforce;
   correlating with the fist processor the activities contained in the information with activities that are to be used for scheduling the personnel of the first workforce, wherein the correlating includes mapping the activities in the information with the corresponding activities of the first workforce; and
   generating with the first processor work schedules for the personnel of the first workforce based, at least in part, on a correlation between the skills of the personnel of the second workforce and the first workforce and a correlation between the activities of the personnel of the second workforce and the first workforce.

2. The method of claim 1, wherein generating the work schedules for the personnel of the first workforce is further based at least in part on an evaluation of the work schedules of the personnel of the second workforce.

3. The method of claim 1, wherein the work schedules of the personnel of the second workforce are locked such that the work schedules of the personnel of the second workforce are not changed responsive to generating the work schedules for the personnel of the first workforce.

4. The method of claim 1, wherein generating the work schedules for the personnel of the first workforce comprises evaluating potential schedules for the personnel of the first workforce based on service level goals computed using contributions of the personnel of the second workforce.

5. The method of claim 1, wherein, in receiving information, the information is received from a workforce manager application associated with the second workforce, of a disparate type with respect to a workforce manager application associated with the first workforce.

6. The method of claim 1, wherein the skills contained in the information comprise a skill priority and a skill proficiency for each skill of each of the personnel of the second workforce.

7. The method of claim 1, wherein the activities comprise a meeting activity and a personal day activity.

8. A system for scheduling a workforce comprising:
   a first processor configured to generate a forecast requirement related to a volume of work to be handled by a first workforce and a second workforce, wherein the second workforce is remote from the first workforce;

a second processor configured to generate work schedules for personnel of the second workforce based on the forecast requirement and skills of the personnel of the second workforce;

the first processor further configured to:
 receive information corresponding to the work schedules and the skills of the personnel of the second workforce that share work with the first workforce, wherein the work schedules comprise activities;
 correlate the skills contained in the information with skills that are to be used for scheduling personnel of the first workforce;
 correlate the activities contained in the information with activities that are to be used for scheduling the personnel of the first workforce, wherein the correlating includes mapping the activities in the information with the corresponding activities of the first workforce; and
 generate work schedules for the personnel of the first workforce based, at least in part, on a correlation between the skills of the personnel of the second workforce and the first workforce and a correlation between the activities of the personnel of the second workforce and the first workforce.

9. The system of claim 8, wherein the second processor generates the work schedules for the personnel of the first workforce based at least in part on an evaluation of the work schedules of the personnel of the second workforce.

10. The system of claim 8, wherein the work schedules of the personnel of the second workforce are locked such that the work schedules of the personnel of the second workforce are not changed responsive to generating the work schedules for the personnel of the first workforce.

11. The system of claim 8, wherein to generate the work schedules for the personnel of the first workforce the second processor evaluates potential schedules for the personnel of the first workforce based on service level goals computed using contributions of the personnel of the second workforce.

12. The system of claim 8, wherein, the information is received from a workforce manager application associated with the second workforce, of a disparate type with respect to a workforce manager application associated with the first workforce.

13. The system of claim 8, wherein the skills contained in the information comprise a skill priority and a skill proficiency for each skill of each of the personnel of the second workforce.

14. The system of claim 8, wherein the activities comprise a meeting activity and a personal day activity.

15. A non-transitory computer readable medium having program instructions stored thereon for operating a computerized workforce management system that, when executed by the computerized workforce management system, direct the computerized workforce management system to:
 generate a forecast requirement related to a volume of work to be handled by a first workforce and a second workforce, wherein the second workforce is remote from the first workforce;
 generate work schedules for personnel of the second workforce based on the forecast requirement and skills of the personnel of the second workforce;
 receive information corresponding to the work schedules and the skills of the personnel of the second workforce that share work with the first workforce, wherein the work schedules comprise activities;
 correlate the skills contained in the information with skills that are to be used for scheduling personnel of the first workforce;
 correlate the activities contained in the information with activities that are to be used for scheduling the personnel of the first workforce, wherein the correlating includes mapping the activities in the information with corresponding activities of the first workforce; and
 generate work schedules for the personnel of the first workforce based, at least in part, on a correlation between the skills of the personnel of the second workforce and the first workforce and a correlation between the activities of the personnel of the second workforce and the first workforce.

* * * * *